(12) United States Patent
Weibel et al.

(10) Patent No.: US 12,338,174 B2
(45) Date of Patent: Jun. 24, 2025

(54) ALUMINUM SULFATE SUSPENSIONS WITH REDUCED VISCOSITY

(71) Applicant: SIKA TECHNOLOGY AG, Baar (CH)

(72) Inventors: Martin Weibel, Zürich (CH); Christian Stenger, Küttigen (CH)

(73) Assignee: SIKA TECHNOLOGY AG, Baar (CH)

( * ) Notice: Subject to any disclaimer, the term of this patent is extended or adjusted under 35 U.S.C. 154(b) by 658 days.

(21) Appl. No.: 17/760,526

(22) PCT Filed: Nov. 2, 2020

(86) PCT No.: PCT/EP2020/080687
§ 371 (c)(1),
(2) Date: Mar. 15, 2022

(87) PCT Pub. No.: WO2021/089483
PCT Pub. Date: May 14, 2021

(65) Prior Publication Data
US 2022/0348500 A1 Nov. 3, 2022

(30) Foreign Application Priority Data
Nov. 7, 2019 (EP) .................................... 19207659

(51) Int. Cl.
*C04B 22/14* (2006.01)
*C04B 103/12* (2006.01)
*C04B 103/30* (2006.01)
*C04B 111/00* (2006.01)

(52) U.S. Cl.
CPC ........ *C04B 22/148* (2013.01); *C04B 2103/12* (2013.01); *C04B 2103/34* (2013.01); *C04B 2111/00146* (2013.01)

(58) Field of Classification Search
CPC .............. C04B 22/148; C04B 2103/12; C04B 2103/34; C04B 2111/00146; C04B 2103/14; C04B 2103/30; C04B 40/0039
See application file for complete search history.

(56) References Cited

U.S. PATENT DOCUMENTS

| 2011/0017100 A1* | 1/2011 | Lindlar | C04B 40/0039 |
| | | | 106/642 |
| 2017/0088464 A1* | 3/2017 | Stenger | C04B 28/04 |

FOREIGN PATENT DOCUMENTS

| EP | 0 812 812 B1 | 1/2003 |
| EP | 1 878 713 A1 | 1/2008 |
| WO | 2005/075381 A1 | 8/2005 |
| WO | 2015/173213 A1 | 11/2015 |

OTHER PUBLICATIONS

May 19, 2022 International Preliminary Report on Patentability issued in International Patent Application No. PCT/EP2020/080687.

* cited by examiner

*Primary Examiner* — Anthony J Green
(74) *Attorney, Agent, or Firm* — Oliff PLC

(57) ABSTRACT

The present invention relates to the use of a soluble magnesium compound for adjusting, in particular reducing, the viscosity of an aluminum sulfate suspension.

19 Claims, No Drawings

ALUMINUM SULFATE SUSPENSIONS WITH REDUCED VISCOSITY

TECHNICAL FIELD

The present invention relates to compositions for adjusting, especially for reducing, the viscosity of an aluminum sulfate suspension. The invention further relates to an aluminum sulfate suspension.

PRIOR ART

There are many known substances that accelerate the solidification and hardening of mineral binder compositions. Known examples include strongly alkaline substances, such as alkali metal hydroxides, alkali metal carbonates, alkali metal silicates, alkali metal aluminates and alkaline earth metal chlorides. However, strongly alkaline substances can give rise to unwanted detriments to the user, for example chemical burns, and they reduce the final strength and lifetime of the concrete.

Therefore, mainly alkali-free accelerators are used, and accelerators based on aluminum sulfate suspensions are among those that have been found to be particularly effective. However, a problem with such accelerators is that viscosities of the accelerators increase significantly with increasing active substance content. Among other things, this complicates the exact metered addition of the accelerators and miscibility with the mineral binder compositions to be accelerated.

WO 2005/075381 A1 describes, for example, a solidification and hardening accelerator comprising aluminum hydroxide, aluminum sulfate and organic acid, wherein the accelerator has a molar ratio of aluminum to organic acid of less than 0.65.

EP 0 812 812 B1 discloses alkali-free accelerator dispersions based on aluminum sulfate and an alkanolamine in the absence of aluminum hydroxide.

However, large amounts of acids and alkanolamines have the disadvantage that, because they can be washed out, the environment can be polluted. Moreover, they are disadvantageous owing to their cost.

EP 1 878 713 A1 (Construction Research and Technology GmbH) describes an accelerator for spray concrete or spray mortar in the form of an aqueous dispersion containing 25% to 40% by weight of aluminum sulfate and aluminum hydroxide, where the molar ratio of aluminum to sulfate in the dispersion is 1.35 to 0.70. Moreover, the aqueous dispersion includes an inorganic stabilizer comprising a magnesium silicate in the form of sepiolite. If sepiolite is used in a proportion of 0.2-3% by weight, according to EP 1 878 713 A1, the result is not only stabilization of the dispersion over wide ranges of the amounts of aluminum and sulfate intended but also an advantageous viscosity of the spray concrete accelerator.

However, a disadvantage of such accelerators is that achievement of the high active substance content requires addition of additional aluminum hydroxide and raising of the ratio of aluminum to sulfate, which is undesirable in some cases. The effect of this is that the costs for the accelerator are relatively high since aluminum hydroxide is costly. Moreover, the magnesium silicate used as stabilizer, in the form of sepiolite, is a very good stabilizer for spray concrete accelerator, but sepiolite has been found to be ineffective with regard to reduction of viscosity. On the contrary, the addition of sepiolite directly after production always leads to an increase in viscosity of the aluminum sulfate suspension.

This means that the aluminum sulfate suspensions can be stabilized at relatively high active substance content, but it is not possible to positively influence or control the viscosities of such aluminum sulfate suspensions, especially directly after production.

There is therefore still a need for new and improved solutions that overcome the aforementioned drawbacks as far as possible.

SUMMARY OF THE INVENTION

It is an object of the invention to provide solutions that enable the production of aluminum sulfate suspensions having a maximum aluminum sulfate content with minimum viscosity. More particularly, a low viscosity directly after the addition of a soluble magnesium compound to the aluminum sulfate suspension is achieved, and a low viscosity is preferably maintained even at later junctures after the addition of a soluble magnesium compound to the aluminum sulfate suspension. This is achieved in particular without influencing the ratio of aluminum to sulfate, and preferably without impairing the efficacy of other components of the aluminum sulfate suspension. The aluminum sulfate suspensions are in particular to be suitable as a very effective solidification accelerator and/or hardening accelerator for hydraulic binders, in particular for spray concrete or spray mortar. The solutions are additionally to be implementable in a very inexpensive and simple manner.

It has been found that, surprisingly, the object of the invention is achieved by the use as claimed in claim 1.

Accordingly, a soluble magnesium compound is used for adjusting, especially for reducing, the viscosity of an aluminum sulfate suspension.

As has been shown, the use of a soluble magnesium compound can significantly reduce the viscosity of an aluminum sulfate suspension for the same aluminum sulfate content and/or significantly increase the aluminum sulfate content for the same viscosity. It is thus possible in a simple manner to produce relatively inexpensive aluminum sulfate suspensions having a high content of aluminum sulfate and simultaneously relatively low viscosity, which are particularly suitable as solidification accelerators and hardening accelerators for spray concrete and spray mortar. The soluble magnesium compound is effective here in particular within a period of 1-48 h, especially 6-24 h, after the addition to the aluminum sulfate suspension. Moreover, it has been shown that the soluble magnesium compound even at later junctures, especially 1-3 months after addition to the aluminum sulfate suspension, is effective as a composition for adjusting, especially for reducing, and/or for maintaining the viscosity. This is particularly true in the case of aluminum sulfate suspensions having a proportion of >34% by weight of aluminum sulfate ($Al_2(SO_4)_3$).

Owing to the use of a soluble magnesium compound, this does not alter the ratio of aluminum to sulfate.

Moreover, the soluble magnesium compound can be combined directly with conventional and stabilizing magnesium silicates, especially with sepiolite, without impairing the efficacy of the soluble magnesium compound. For instance, in an aluminum sulfate suspension, if required, it is possible, for example, to use a magnesium silicate, especially sepiolite, in combination with the soluble magnesium compound, by means of which particularly stable aluminum sulfate suspensions having high active substance content and low viscosity are obtainable.

In addition, if required, it is possible to dispense with possibly problematic and/or costly substances such as alkali metal compounds, alkanolamines, carboxylic acids, aluminum hydroxide. This can be done without significant losses in relation to accelerating action.

Further aspects of the invention are the subject of further independent claims. Particularly preferred embodiments of the invention are the subject of the dependent claims.

Ways of Executing the Invention

In a first aspect, the invention relates to the use of a soluble magnesium compound for adjusting, especially for reducing, the viscosity of an aluminum sulfate suspension.

An "aluminum sulfate suspension" is a heterogeneous substance mixture composed of a liquid, especially water, and particles of aluminum sulfate finely distributed therein. It is preferably an aqueous aluminum sulfate suspension. As well as the aluminum sulfate in particle form, a portion of the aluminum sulfate may also be in dissolved and/or chemically modified form. An example of a chemically modified form of aluminum sulfate is jurbanite ($AlOHSO_4 \cdot 5H_2O$). An aluminum sulfate suspension in the present context is not a pure solution; instead, there are always finely divided particles of aluminum sulfate in the liquid phase, especially water. In addition to the liquid and the aluminum sulfate, the aluminum sulfate suspension may contain further components that may be in dissolved and/or solid form.

More preferably, the aluminum sulfate suspension is a solidification accelerator and/or hardening accelerator for a mineral binder, especially a spray concrete accelerator. Correspondingly, the soluble magnesium compound is preferably used for adjusting the viscosity of a solidification accelerator and/or hardening accelerator based on an aluminum sulfate suspension for a mineral binder, especially for a spray concrete accelerator.

The expression "solidification accelerator and/or hardening accelerator" especially represents a substance which, if a mineral binder is added and compared to a blank sample without added substance/without accelerator, leads to an increase in the compressive strength of the mineral binder after a defined juncture after mixing, especially at a juncture within 2 minutes-24 hours after mixing.

A "soluble magnesium compound" in the present context is a magnesium compound which is soluble at at least 5 g per 1 liter in distilled water adjusted to a pH=4 with HCl, at 25° C. and a pressure of 1 bar.

What is meant more particularly by "adjusting the viscosity" in the present context is that the viscosity of the aluminum sulfate suspension is controlled and/or adjusted by the soluble magnesium compound. More particularly, the viscosity of the aluminum sulfate suspension is altered or reduced by the presence of the soluble magnesium compound with respect to an aluminum sulfate suspension that does not contain the soluble magnesium compound but is otherwise of identical composition.

Viscosity is more particularly determined according to standard DIN EN ISO 2431:2011. Preferably with an ISO No. 6 cup and at a temperature of 23° C.

Proportions by weight and molar proportions, unless stated otherwise, are each based on the ready-to-use aluminum sulfate suspension after adjustment of the viscosity. The ready-to-use aluminum sulfate suspension is especially designed for direct use as a solidification accelerator and/or hardening accelerator. The ready-to-use aluminum sulfate suspension thus includes, as well as the aluminum sulfate and the liquid, the soluble magnesium compound and any further components present.

The aluminum sulfate suspension is preferably alkali- and/or chloride-free.

What is typically meant by alkali-free in construction chemistry is a composition having less than 1% by weight of alkali metal and/or alkaline earth metal ions calculated as sodium oxide equivalent ($Na_2O$), based on the total weight of the composition or the aluminum sulfate suspension.

$Na_2O$ equivalent refers to the resultant weight if all alkali metal ions (especially Na and K) were present as $Na_2O$.

What is typically meant by chloride-free in construction chemistry is a composition having less than 0.1% by weight of chloride ions, based on the total weight of the composition or aluminum sulfate suspension.

The soluble magnesium compound is especially used to adjust the viscosity, especially to reduce the viscosity.

More particularly, the soluble magnesium compound is used for adjusting the viscosity, especially for reducing the viscosity, of an aluminum sulfate suspension, and the adjustment of the viscosity, especially the reduction, is preferably concluded within a period of 1-168 h, more preferably 1-48 h, specifically within a period of 6-24 h, after the aluminum sulfate suspension with the added soluble magnesium compound has been obtained.

In particular, once the viscosity has been adjusted, it remains stable over a prolonged period, especially over a period of several months. Specifically, the soluble magnesium compound is therefore used to adjust the viscosity, especially to reduce the viscosity, of an aluminum sulfate suspension over a period of several months, most preferably 1-3 months, after the aluminum sulfate suspension with the added soluble magnesium compound has been obtained. This is especially true in the case of aluminum sulfate suspensions having a proportion of >34% by weight of aluminum sulfate ($Al_2(SO_4)_3$).

Since the soluble magnesium compound enables adjustment of the viscosity, especially reduction of the viscosity, within a period of 1-168 h, more preferably 1-48 h, specifically within a period of 6-24 h, after the aluminum sulfate suspension with the added soluble magnesium compound has been obtained, the viscosity of the aluminum sulfate suspension can be adjusted to the desired value even shortly after the production. This in turn permits a shorter production time since the aluminum sulfate suspensions can be used as intended within a few hours after production, especially as solidification accelerator and/or hardening accelerator.

Since a soluble magnesium compound additionally enables adjustment of the viscosity, especially reduction of the viscosity, over a prolonged period, especially over a period of several months, after the aluminum sulfate suspension with the added soluble magnesium compound has been obtained, it is possible to achieve a long-term reduction in viscosity. It is thus possible to store the aluminum sulfate suspensions with essentially constant viscosity over a prolonged period if required.

The soluble magnesium compound can accordingly be used in a method of adjusting the viscosity of an aluminum sulfate suspension.

A further aspect of the present invention is accordingly a method of adjusting the viscosity, especially reducing the viscosity, of an aluminum sulfate suspension within a period of 1-168 h, more preferably 1-48 h, specifically within a period of 6-24 h, after the aluminum sulfate suspension with the added soluble magnesium compound has been obtained, and/or for adjusting the viscosity, especially reducing the viscosity, over a prolonged period, especially over a period of several months, comprising the steps of:
a) initially charging an aqueous preparation of aluminum sulfate and
b) mixing in a soluble magnesium compound
c) optionally mixing in further aluminum sulfate,
to obtain an aluminum sulfate suspension,
or
a) initially charging an aqueous preparation of a soluble magnesium compound and
b) mixing in aluminum sulfate to obtain an aluminum sulfate suspension.

A preparation in the present context is a solution or suspension. An aqueous preparation is accordingly a solution or suspension in water.

The aqueous formulation of aluminum sulfate is a solution or a suspension of aluminum sulfate in water. It is also possible that proportions of aluminum sulfate in dissolved form and proportions of aluminum sulfate in suspended form are present in the aqueous formulation.

The solidification and/or hardening accelerators of the invention for hydraulic binders, in particular for spray concrete or spray mortar, are aluminum sulfate suspensions.

The soluble magnesium compound can be added directly to the aluminum sulfate formulation during the production thereof. It is alternatively possible to add the soluble magnesium compound to the aluminum sulfate formulation shortly after production thereof, for example within 1 h after production thereof. Finally, it is also possible to add the soluble magnesium compound to the aluminum sulfate preparation only after a prolonged period after production thereof, for example after 5 days or longer.

The soluble magnesium compound is especially a basic magnesium compound. This means that the soluble magnesium compound is capable of raising the pH of distilled water that has been adjusted to a pH=4 with HCl at 25° C. and a pressure of 1 bar when it is added to the acidified water.

The soluble magnesium compound is preferably a nonsilicatic magnesium compound. A "nonsilicatic magnesium compound" means a compound that contains magnesium but no silicate groups.

More particularly, the soluble magnesium compound does not include any sheet silicate and/or any phyllosilicate, specifically no sepiolite.

The soluble magnesium compound preferably includes a magnesium salt and/or a magnesium complex.

It may further be advantageous when the soluble magnesium compound contains calcium and/or iron, preferably calcium. Calcium may especially be advantageous when the aluminum sulfate suspension is used as solidification and/or hardening accelerator in mineral binders based on specific cements.

However, the soluble magnesium compounds used in accordance with the invention permit formulation of highly effective solidification and/or hardening accelerators that are essentially free of calcium. Since calcium, under some circumstances, slows the reaction or dissolution of cement clinker, a solidification and/or hardening accelerator essentially without calcium may be advantageous.

In particular, the soluble magnesium compound is an oxide, hydroxide, carbonate, nitrate, sulfate, phosphate, halide, formate, acetate, citrate or mixtures thereof.

Further preferably, the soluble magnesium compound is an oxide, hydroxide, carbonate, nitrate, formate, acetate, citrate or mixtures thereof.

The soluble magnesium compound is preferably a magnesium hydroxide, a calcium magnesium hydroxide, a magnesium carbonate, a calcium magnesium carbonate, a magnesium carbonate hydroxide, a calcium magnesium carbonate hydroxide, a magnesium oxide and/or a calcium magnesium oxide. Most preferably, the magnesium compound is selected from magnesium carbonate, magnesium oxide and/or magnesium hydroxide. It is specifically magnesium oxide.

The soluble magnesium compound is preferably $Mg(OH)_2$, $MgCa(OH)_4$, $MgCO_3$, $MgCa(CO_3)_2$, $4MgCO_3 \cdot Mg(OH)_2$, MgO and/or $MgCaO_2$. It is more preferably $MgCO_3$, $Mg(OH)_2$ and/or MgO, specifically MgO.

These magnesium compounds have been found to be particularly advantageous in the present context since it is possible thereby to achieve a significant reduction in viscosity without adversely affecting further components. Moreover, the substances are of good availability.

In principle, however, it is also possible to use other soluble magnesium compounds.

The amount of the soluble magnesium compound is preferably chosen such that the magnesium atoms, based on the total weight of the aluminum sulfate suspension, have a proportion of 0.02-6.3% by weight, especially 0.04-4.2% by weight, more preferably 0.2-2.1% by weight, specifically 0.6-1.8% by weight.

If the soluble magnesium compound used is magnesium oxide, this is used, based on the total weight of the aluminum sulfate suspension, preferably in an amount of 0.035-10.4% by weight, more preferably 0.07-6.9% by weight, especially preferably 0.35-3.5% by weight, specifically 1-3% by weight.

These amounts enable a particularly good reduction in viscosity without significantly adversely affecting the solidification- and/or hardening-accelerating properties of the aluminum sulfate suspension.

The aluminum sulfate suspension, based on the total weight of the aluminum sulfate suspension, has a proportion of sulfate ($SO_4^-$) of 19-40% by weight, especially 24-36% by weight, specifically 28-34% by weight.

It is further preferable when the aluminum sulfate suspension, based on the total weight of the aluminum sulfate suspension, has a proportion of aluminum (Al) of 3.5-10% by weight, especially 4.5-8.7% by weight, in particular 5.4-7% by weight.

With such proportions of aluminum and sulfate, it is possible to produce aluminum sulfate suspensions with a high active ingredient content that feature particularly good acceleration of solidification and/or hardening.

The aluminum sulfate suspension advantageously contains aluminum sulfate, aluminum hydroxysulfate, sulfuric acid, aluminum hydroxide and/or aluminum hydroxide carbonate. Particular preference is given to aluminum sulfate.

The sulfate in the aluminum sulfate suspension especially comes from aluminum sulfate, aluminum hydroxysulfate and/or sulfuric acid. Particular preference is given to aluminum sulfate. In other words, the accelerator especially contains at least one of the substances mentioned as source for sulfate.

The aluminum in the accelerator advantageously comes from aluminum sulfate, aluminum hydroxysulfate, aluminum hydroxide and/or aluminum hydroxide carbonate. Particular preference is given to aluminum sulfate. In other words, the accelerator especially contains at least one of the substances mentioned as source for aluminum.

In an advantageous embodiment, the aluminum sulfate suspension, based on the total weight of the aluminum sulfate suspension, contains 22-46% by weight, especially 28-43% by weight, preferably 34-41% by weight, of aluminum sulfate ($Al_2(SO_4)_3$).

The aluminum sulfate usable for the preparation may especially contain different amounts of water of crystallization. The aluminum sulfate typically used is aluminum sulfate tetradecahydrate ($Al_2(SO_4)_3 \cdot 14.3H_2O$). It is typically also referred to as 17% aluminum sulfate because it contains 17% $Al_2O_3$.

The stated amounts relating to aluminum sulfate that are mentioned in this present document are each based on $Al_2(SO_4)_3$ without water of crystallization. The stated amounts with regard to the different reference compounds can be easily converted with reference to the following relationships: $Al_2(SO_4)_3 \cdot 14.3H_2O$ contains 57% by weight of $Al_2(SO_4)_3$ or 17% by weight of $Al_2O_3$.

The aluminum sulfate may also be produced by a reaction of aluminum hydroxide and/or aluminum metal with sulfuric acid in the preparation of the aluminum sulfate suspension, with corresponding formation of sulfate ions in the aqueous solution. In general, aluminum sulfate can be produced by a reaction of a basic aluminum compound and/or aluminum metal with sulfuric acid.

In a further advantageous embodiment, the aluminum sulfate suspension, based on the total weight of the aluminum sulfate suspension, contains 0.01-15% by weight, especially 0.05-5% by weight, more preferably 0.1-2% by weight, of aluminum hydroxide.

It is thus possible, for example, to increase the aluminum content independently of the sulfate content of the aluminum sulfate suspension in an effective manner.

The aluminum hydroxide may be used in amorphous and/or crystalline form. Advantageously, amorphous aluminum hydroxide is used. This is especially since crystalline aluminum hydroxide typically reacts sufficiently only at temperatures of >130° C. and a pressure of >1 bar. The aluminum hydroxide may also be used in the form of aluminum hydroxide carbonate, aluminum hydroxysulfate or the like.

In an advantageous embodiment, the molar ratio of aluminum to sulfate in the aluminum sulfate suspension is <0.7, especially 2:3. In this case, the aluminum sulfate suspension can be prepared in a particularly simple manner by the suspending of aluminum sulfate ($Al_2(SO_4)_3$). In the inventive use of the soluble magnesium compound, it is thus possible to prepare aluminum sulfate suspensions having high active ingredient contents and low viscosities.

In a further advantageous embodiment, the molar ratio of aluminum to sulfate in the aluminum sulfate suspension is in the range of 0.5-2, preferably 0.67-1.35, in particular 0.7-1.0. Such aluminum sulfate suspensions have improved efficacy for certain applications.

The aluminum sulfate suspension, based on the total weight of the aluminum sulfate suspension, has a proportion of water of 30-80% by weight, especially 40-70% by weight, preferably 50-65% by weight. Water of crystallization in the components of the aluminum sulfate suspension, for example water of crystallization from aluminum sulfate, is included in the calculation here.

In a further advantageous embodiment, the soluble magnesium compound is used for reduction of viscosity in combination with a calcium compound and/or an iron compound. In particular, both a calcium compound and an iron compound are used. Without being tied to the theory, it is assumed that the calcium compound and iron compound additionally enhance the effect of the soluble magnesium compound.

The calcium compound and/or the iron compound is, in particular, an oxide, hydroxide, carbonate, nitrate, sulfate, phosphate, halide, formate, acetate and/or citrate.

The calcium compound and/or the iron compound is preferably an oxide, hydroxide, carbonate, nitrate, formate, acetate and/or citrate.

More preferably, the calcium compound is a calcium carbonate, a calcium oxide and/or a calcium hydroxide. Particular preference is given to calcium oxide.

Specifically, the calcium compound is $Ca(OH)_2$, $CaCO_3$ and/or $CaO$. Particular preference is given to $CaO$.

An amount of the calcium compound is chosen in particular such that the calcium atoms, based on the total weight of the aluminum sulfate suspension, have a proportion of 0.001-4% by weight, preferably 0.01-2% by weight, especially 0.07-1.4% by weight, specifically 0.1-0.7% by weight.

If the calcium compound used is $CaO$, a proportion of $CaO$, based on the total weight of the aluminum sulfate suspension, is advantageously 0.001-5% by weight, preferably 0.01-3% by weight, especially 0.1-2% by weight, specifically 0.2-1% by weight.

The iron compound is more preferably an iron oxide. Specifically, the iron compound is $Fe_2O_3$.

The amount of the iron compound is in particular chosen such that the iron atoms, based on the total weight of the aluminum sulfate suspension, have a proportion of 0.001-10% by weight, especially 0.1-5% by weight, specifically 0.2-2% by weight, most preferably 0.1-0.6% by weight.

If the iron compound used is $Fe_2O_3$, a proportion of $Fe_2O_3$, based on the total weight of the aluminum sulfate suspension, is advantageously 0.001-14.3% by weight, especially 0.1-7.1% by weight, specifically 0.2-2% by weight.

In a further advantageous embodiment, the aluminum sulfate suspension contains silica.

The term "silica" in the present document means a silica, including not only orthosilicic acid but also all forms of silicon dioxide, i.e. the anhydride of orthosilicic acid, actual silicon dioxide, and also colloidal, precipitated or fumed silica or silica fume. The silica is preferably silicon dioxide or $SiO_2$.

The silica is preferably present in such an amount that the content of silicon dioxide, based on the total weight of the aluminum sulfate suspension, is 0.001% to 5% by weight, preferably 0.1% to 2% by weight, even more preferably 0.2% to 1% by weight.

In particular, the aluminum sulfate suspension includes an alkali metal aluminate and/or an alkaline earth metal aluminate. It is preferably a lithium aluminate, sodium aluminate, potassium aluminate and/or calcium aluminate.

Alkali metal aluminate can be used in powder form, but preference is given to aqueous solutions of alkali metal aluminate.

Examples include $NaAlO_2$, $CaAl_2O_4$, $Ca_3Al_2O_6$, $Ca_4Al_2Fe_{0.33}Si_{0.25}O_8$.

An amount of the alkali metal aluminate and/or alkaline earth metal aluminate, especially of lithium aluminate, sodium aluminate, potassium aluminate and/or calcium aluminate, is preferably 0.001-20% by weight in total, especially 0.1-8% by weight, specifically 0.2-4% by weight, most preferably 0.5-2% by weight, based in each case on the total weight of the aluminum sulfate suspension. In other words, the stated weights for the total amount of lithium aluminate, sodium aluminate, potassium aluminate and calcium aluminate are combined.

In addition, for preparation of the aluminum sulfate suspension, it is possible to use at least one further divalent or higher-valency metal sulfate, preferably in an amount of 0.1-5% by weight, based on the total weight of the aluminum sulfate suspension. A particularly preferred further metal sulfate is manganese(II) sulfate. Iron sulfate is likewise suitable.

It may further be advantageous when the aluminum sulfate suspension additionally contains 0.1-15% by weight, preferably 0.1-5% by weight, specifically 0.2-2% by weight, based on the total weight of the aluminum sulfate suspension, of alkanolamine. The alkanolamine used is advantageously monoethanolamine, diethanolamine, triethanolamine and/or methyldiisopropanolamine.

The aluminum sulfate suspension may additionally contain stabilizers, for example bentonite, palygorskite (e.g. Actigel 208), kaolin and/or magnesium silicates, e.g. sepiolite. It is preferable that aluminum sulfate suspensions of the invention are free of organic plasticizers, especially of polycarboxylates, polycarboxylate esters and/or polycarboxylate ethers.

The aluminum sulfate suspension may especially contain a magnesium silicate, especially a sheet silicate and/or phyllosilicate, for example sepiolite and/or bentonite. If present, a proportion of magnesium silicate is advantageously 0.001-5% by weight, preferably 0.1-2% by weight, specifically 0.2-1% by weight, based on the total weight of the aluminum sulfate suspension. Magnesium silicates in the present context are inert, or insoluble according to the above definition of solubility, and contribute to phase stabilization.

Moreover, the soluble magnesium compound may be used in combination with a magnesium silicate for adjustment, especially for reduction, of viscosity and for simultaneous stabilization of the aluminum sulfate suspension. The magnesium silicate may especially be a sheet silicate and/or phyllosilicate, for example sepiolite and/or bentonite. Particular preference is given to sepiolite. The magnesium silicate, especially sepiolite, is preferably used in a proportion of 0.001-5% by weight, preferably 0.1-2% by weight, specifically 0.2-1% by weight, based on the total weight of the aluminum sulfate suspension. The soluble magnesium compound is preferably selected from magnesium carbonate, magnesium oxide and/or magnesium hydroxide. It is specifically magnesium oxide. The amount of the soluble magnesium compound is preferably chosen such that the magnesium atoms, based on the total weight of the aluminum sulfate suspension, have a proportion of 0.02-6.3% by weight, especially 0.04-4.2% by weight, more preferably 0.2-2.1% by weight, specifically 0.6-1.8% by weight.

The aluminum sulfate suspension may of course comprise further constituents. These may especially be fluorine compounds, for example hydrofluoric acid, alkali metal fluorides and/or fluoro complexes. These enable, for example, another enhancement of the accelerating action.

In particular, the aluminum sulfate suspension, based on the total weight of the aluminum sulfate suspension, contains 0.01-10% by weight, especially 0.1-2% by weight, preferably 0.2-0.5% by weight, of fluoride. This can enhance the accelerating action of the aluminum sulfate suspension.

The aforementioned substances are especially at least partly encountered as ions in solution. But they may also occur, for example, in complexed form or undissolved in the aluminum sulfate suspension.

A particularly advantageous aluminum sulfate suspension comprises or consists of, for example, the following components (in % by weight, based in each case on the total weight of the aluminum sulfate suspension):
a) 19% to 40% by weight, especially 24-36% by weight, specifically 28-34% by weight, of sulfate;
b) 3.5-10% by weight, especially 4.5-8.7% by weight, in particular 5.4-7% by weight, of aluminum;
c) 0.02-6.3% by weight, especially 0.04-4.2% by weight, more preferably 0.2-2.1% by weight, specifically 0.6-1.8% by weight, of magnesium;
d) optionally 0.001-4% by weight, preferably 0.01-2% by weight, especially 0.07-1.4% by weight, specifically 0.1-0.7% by weight, of calcium;
e) optionally 0.001-10% by weight, especially 0.1-5% by weight, specifically 0.2-2% by weight, most preferably 0.1-0.6% by weight, of iron;
f) optionally 0.001% to 5% by weight, preferably 0.1% to 2% by weight, even more preferably 0.2% to 1% by weight, of silicon dioxide or $SiO_2$;
g) and water, where the portion missing from 100% by weight is preferably water, more preferably 30-77.48% by weight, especially 40-70% by weight, most preferably 50-65% by weight, of water.

A particularly preferred aluminum sulfate suspension contains, for example (in % by weight, based in each case on the total weight of the aluminum sulfate suspension):
a) 22-46% by weight, especially 28-43% by weight, preferably 34-41% by weight, of aluminum sulfate $(Al_2(SO_4)_3)$;
b) optionally 0.01-15% by weight, especially 0.05-5% by weight, more preferably 0.1-2% by weight, of aluminum hydroxide $(Al(OH)_3)$;
c) 0.035-10.4% by weight, preferably 0.07-6.9% by weight, more preferably 0.5-3.5% by weight, specifically 1-3% by weight, of magnesium oxide;
d) optionally 0.001-5% by weight, especially 0.1-2% by weight, specifically 0.2-1% by weight, of calcium oxide;
e) optionally 0.001-10% by weight, especially 0.1-5% by weight, specifically 0.2-2% by weight, most preferably 0.1-0.6% by weight, of iron;
f) optionally 0.001% to 5% by weight, preferably 0.1% to 2% by weight, even more preferably 0.2% to 1% by weight, of silicon dioxide;
g) optionally 0.001-20% by weight, especially 0.1-8% by weight, specifically 0.2-4% by weight, most preferably 0.5-2% by weight, of an alkali metal aluminate and/or an alkaline earth metal aluminate, especially sodium aluminate, potassium aluminate and/or calcium aluminate;
h) optionally 0.1-15% by weight, preferably 0.1-5% by weight, specifically 0.2-2% by weight, of alkanolamine;
i) optionally 0.01-10% by weight, especially 0.1-2% by weight, preferably 0.2-0.5% by weight, of fluoride;
j) and water, where the portion missing from 100% by weight is preferably water, more preferably 30-77.965% by weight, especially 40-70% by weight, most preferably 50-65% by weight, of water.

In a preferred embodiment, the most preferred ranges and substances in each case are chosen.

In a specifically preferred embodiment, the aluminum sulfate suspension comprises or consists of, for example, the following components (in % by weight, based in each case on the total weight of the aluminum sulfate suspension):
a) 34-41% by weight of aluminum sulfate $(Al_2(SO_4)_3)$;
b) 1-3% by weight of magnesium oxide;
c) 0.2-1% by weight of calcium oxide;
d) optionally 0.001-14.3% by weight, especially 0.1-7.1% by weight, specifically 0.2-2% by weight, of iron oxide;

e) optionally 0.001% to 5% by weight, preferably 0.1% to 2% by weight, even more preferably 0.2% to 1% by weight, of silicon dioxide;

f) optionally 0.001-20% by weight, especially 0.1-8% by weight, specifically 0.2-4% by weight, most preferably 0.5-2% by weight, of an alkali metal aluminate and/or an alkaline earth metal aluminate, especially sodium aluminate, potassium aluminate and/or calcium aluminate;

g) and water, where the portion missing from 100% by weight is preferably water, more preferably 50-64.8% by weight of water.

In a further specifically preferred embodiment, the aluminum sulfate suspension comprises or consists of, for example, the following components (in % by weight, based in each case on the total weight of the aluminum sulfate suspension):

a) 34-41% by weight of aluminum sulfate ($Al_2(SO_4)_3$);

b) 1-3% by weight of magnesium oxide;

c) 0.8-6% by weight, most preferably 0.5-2% by weight, of an alkali metal aluminate and/or an alkaline earth metal aluminate, especially sodium aluminate, potassium aluminate and/or calcium aluminate;

d) optionally 0.001-5% by weight, especially 0.1-2% by weight, specifically 0.2-1% by weight, of calcium oxide;

e) optionally 0.001-5% by weight, especially 0.1-2% by weight, specifically 0.2-1% by weight, of iron oxide;

f) optionally 0.001% to 5% by weight, preferably 0.1% to 2% by weight, even more preferably 0.2% to 1% by weight, of silicon dioxide;

g) and water, where the portion missing from 100% by weight is preferably water, more preferably 50-64.2% by weight of water.

A further aspect of the present invention relates to a process for producing an aluminum sulfate suspension as described above which is especially designed as a setting and/or hardening accelerator. The aforementioned components or substances are especially mixed to give an aqueous suspension. The individual substances can in principle be added in any sequence. The aluminum sulfate suspensions of the invention are correspondingly obtainable by processes of this kind.

The aluminum sulfate suspensions obtainable in accordance with the invention may be used as solidification and/or hardening accelerators for acceleration of setting and/or hardening of mineral binders and/or mineral binder compositions. The composition is especially a mortar and/or concrete composition, especially a spray mortar and/or a spray concrete.

The expression "mineral binder" is especially understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime). A "mineral binder composition" is correspondingly a composition containing at least one mineral binder.

Examples of mineral binders, the hardening and/or setting of which can be accelerated by the aluminum sulfate suspensions of the invention, are cements, for example portland cement, mixed cements, alumina cements, calcium sulfoaluminate cements, and lime, hydraulic lime and gypsum, or mixtures of two or more of the mineral binders mentioned.

More particularly, the mineral binder or the binder composition comprises a hydraulic binder, preferably cement. Particular preference is given to a cement having a cement clinker content of >35% by weight; in particular, the cement is CEM type I, II, III, IV or V (according to standard EN 197-1). A proportion of the hydraulic binder in the overall mineral binder is advantageously at least 5% by weight, especially at least 20% by weight, preferably at least 35% by weight, especially at least 65% by weight.

In a further advantageous embodiment, the mineral binder consists to an extent of at least 95% by weight of hydraulic binder, especially of cement clinker.

It may also be advantageous if the binder composition contains other binders in addition to or in place of a hydraulic binder. These are especially latently hydraulic binders and/or pozzolanic binders. Suitable latently hydraulic and/or pozzolanic binders are, for example, slag, fly ash and/or silica dust. The binder composition may likewise comprise inert substances, for example ground limestone, ground quartz and/or pigments.

In an advantageous embodiment, the mineral binder contains 5-95% by weight, especially 5-65% by weight, specifically 15-35% by weight, of latently hydraulic and/or pozzolanic binders.

The present invention further relates to a method of accelerating the solidifying and/or hardening of mineral binders or mineral binder compositions, for example mortar or concrete, wherein an above-described aluminum sulfate suspension is added to a mineral binder or a mineral binder composition as a solidification and/or hardening accelerator in an amount of 0.1% to 15% by weight, especially of 1% to 10% by weight, more preferably 4-8% by weight, based on the weight of the mineral binder.

For example, it is possible to add the aluminum sulfate suspension to a concrete or mortar composition, especially to a spray concrete or a spray mortar, with use of the concrete or mortar composition for coating of a substrate. The substrate is especially a surface of a tunnel, of a mine, of an excavation, of a bay, of a well and/or of a drain.

The aluminum sulfate suspension is preferably metered into a spray mortar or spray concrete by the dry or wet spraying method, with addition of the aluminum sulfate suspension to the dry or water-mixed binder, spray mortar or spray concrete in the conveying conduit, the pre-wetting nozzle or the spray nozzle.

It is also possible to add the aluminum sulfate suspension to a concrete or mortar composition, especially to a spray concrete or a spray mortar, with use of the concrete or mortar composition for production of free-form structures.

In addition, it is possible to mix the aluminum sulfate suspension into a concrete or mortar composition in an additive manufacturing method, preferably by means of a dynamic mixer.

Further modifications and advantages of the invention will be apparent to the person skilled in the art from the working examples that follow.

WORKING EXAMPLES

1. Production of Aluminum Sulfate Suspensions

A beaker was initially charged with a defined amount of water. While stirring (mechanical propeller stirrer at 850 revolutions), the respective powder mixture ($Al_2(SO_4)_3 \cdot 14.3H_2O$; MgO, $MgCaO_2$, sepiolite) was then added in portions with the proportions according to table 1, and the suspension was heated up to 50° C. and stirred at that temperature for 1 h (the proportions of $NaAlO_2$ are based on sodium aluminate as such, without the water of the solution.

The latter is included under $H_2O$). Subsequently, the heater was switched off and the mixture was stirred for a further 6 h.

TABLE 1

Aluminum sulfate suspensions prepared

| | Example | | |
|---|---|---|---|
| Substance | 1 | 2 | 3 |
| $H_2O$ [% by wt.] | 28.8 | 28.3 | 27.3 |
| $Al_2(SO_4)_3 \cdot 14.3\ H_2O$ [% by wt.] | 68 | 68 | 68 |
| MgO [% by wt.] | 2.5 | 2 | — |
| $MgCaO_2$ [% by wt.] | — | 1 | 4 |
| Sepiolite[1] [% by wt.] | 0.7 | 0.7 | 0.7 |

[1] Pangel S9 from Tolsa Group

The aluminum sulfate suspensions thus prepared were found to be storage-stable over several months and have a viscosity suitable for practical applications as spray concrete accelerator in the region of <2000 mPa·s. The viscosity was measured according to standard DIN EN ISO 2431:2011 with an ISO No. 6 cup at a temperature of 23° C.

2. Effect of the Proportion of the Soluble Magnesium Compound

In a second set of experiments, the effect of the proportion of the soluble magnesium compound was examined. For this purpose, an aluminum sulfate suspension having a proportion of $Al_2(SO_4)_3 \cdot 14.3H_2O$ of 62% by weight and different amounts of MgO (0-5% by weight) was prepared analogously to the method described in chapter 1, except that the samples were heated up to 60° C. and stirred at 650 revolutions per minute.

The viscosities were measured by the same method as described in chapter 1 after 6 h and after 24 h hours. Table 2 gives an overview of the results.

TABLE 2

Dependence of viscosity on the proportion of the soluble magnesium compound

| | Proportion of MgO [% by wt.] | | | | | |
|---|---|---|---|---|---|---|
| | 0 | 1 | 2 | 3 | 4 | 5 |
| Viscosity after 6 h [mPa · s] | 495 | 515 | 490 | 141 | 150 | 90 |
| Viscosity after 24 h [mPa · s] | 500 | 805 | 403 | 155 | 190 | 111 |

As apparent from table 2, the viscosity of the aluminum sulfate suspension can be significantly reduced at a high aluminum sulfate content by the addition of 2% by weight or more of MgO. Accordingly, a soluble magnesium compound can be used to control the viscosity of an aluminum sulfate suspension after 6-24 hours.

In a third set of experiments, in place of magnesium oxide, magnesium hydroxide was tested as viscosity-reducing compound in an aluminum sulfate suspension with additional aluminum hydroxide.

For this purpose, aqueous aluminum sulfate suspensions comprising 63% by weight of $Al_2(SO_4)_3 \cdot 14.3H_2O$, 0.6% by weight of $Al(OH)_3$ (amorphous, containing 75% by weight of $Al(OH)_3$ with 25% by weight of water of crystallization), and water as the balance, were added to different amounts of $Mg(OH)_2$ (0-5% by weight; see table 3) analogously to the method described in chapter 1. But the samples were each heated up to 40° C. and stirred at 850 revolutions per minute.

The viscosities were measured by the same method as described in chapter 1 after 6 h, 24 h and 48 h hours. Table 3 gives an overview of the results.

TABLE 3

Dependence of viscosity on the proportion of the soluble magnesium compound

| | Proportion of $Mg(OH)_2$ [% by wt.] | | | | | |
|---|---|---|---|---|---|---|
| | 0 | 1 | 2 | 3 | 4 | 5 |
| Viscosity after 6 h [mPa · s] | 536 | 752 | 745 | 497 | 462 | — |
| Viscosity after 24 h [mPa · s] | 387 | 420 | 273 | 166 | 225 | 275 |
| Viscosity after 48 h [mPa · s] | 260 | 272 | 289 | 160 | 130 | 208 |

As apparent from table 3, the viscosity of the aluminum sulfate suspensions comprising aluminum hydroxide can be significantly reduced at a high aluminum sulfate content by the addition of 2% by weight or more of $Mg(OH)_2$. Accordingly, it is possible to use $Mg(OH)_2$ as soluble magnesium compound to control the viscosity of an aluminum sulfate suspension after 6-48 hours and in particular after 24-48 h.

In addition, it has been found that the viscosities of the aluminum sulfate suspension thus produced can be maintained over 3 months without significant change.

The above-described aluminum sulfate suspensions have been found to be suitable accelerators for spray concrete and spray mortar.

3. Effect of Magnesium Silicates (Comparative Experiments)

For comparative purposes, the effect of sepiolite (magnesium silicate) on the viscosity of an aluminum sulfate suspension was examined. For this purpose, an aluminum sulfate suspension having a proportion of $Al_2(SO_4)_3 \cdot 14.3H_2O$ of 62% by weight and different amounts of sepiolite (0-5% by weight) was prepared analogously to the method described in chapter 1, except that the samples were heated up to 60° C. and stirred at 650 revolutions per minute.

The viscosities were measured by the same method as described in chapter 1 after 6 h, 24 h and 48 h hours. Table 4 gives an overview of the results.

TABLE 4

Dependence of viscosity on the proportion of the soluble magnesium compound

| | Proportion of sepiolite[1] [% by wt.] | |
|---|---|---|
| | 0 | 1 |
| Viscosity after 6 h [mPa · s] | 452 | 1186 |
| Viscosity after 24 h [mPa · s] | 518 | 1275 |
| Viscosity after 48 h [mPa · s] | 396 | 1066 |

[1] Pangel S9 from Tolsa Group

In the case of more than 1% by weight of sepiolite, the viscosity was so high that it was no longer measurable by the aforementioned method.

The results make it clear that sepiolite cannot be used to reduce the viscosity of an aluminum sulfate suspension, by contrast with the soluble magnesium compounds, within the period up to 48 hours after preparation. On the contrary, the viscosity of the aluminum sulfate suspension is significantly increased on account of the addition.

4. Effect of Additional Organic Acid (Comparative Experiments)

For comparative purposes, the effect of citric acid and formic acid on the viscosity of an aluminum sulfate suspension was examined. For this purpose, the amount of magnesium hydroxide specified in table 5 was converted to a slurry in the specified amount of water, and 0.5 g of citric acid and 0.2 g of ascorbic acid were added in each case. Thereafter, 37 g of $Al_2(SO_4)_3 \cdot 14H_2O$ and 15.6 g of amorphous $Al(OH)_3$ were added in each case and dissolved at elevated temperature. Stirring of the solution was continued until the temperature had dropped to 40° C. The viscosities of the solutions thus prepared, comprising proportions of finely dispersed solids, were measured by the same method as described in chapter 1 after 24 h hours. Table 5 gives an overview of the results.

TABLE 5

Influence of organic acid on the viscosity of $Mg(OH)_2$-containing aluminum sulfate suspensions

| Test | 4-1 | 4-2 | 4-3 | 4-4 |
|---|---|---|---|---|
| Water [g] | 46.7 | 45.7 | 43.7 | 41.7 |
| $Mg(OH)_2$ [g] | 0 | 1 | 3 | 5 |
| Viscosity after 24 h [mPa · s] | 28 | 34 | 434 | n.m. | n.m.: not measurable - solid

As apparent from table 5, aluminum sulfate suspensions having a relatively low aluminum sulfate content and a proportion of organic acid have relatively low viscosities. Addition of $Mg(OH)_2$ in amounts of 3% by weight or more leads to a distinct increase in viscosity or even to solidification of the suspension. Accordingly, it becomes clear that the viscosities of aluminum sulfate suspensions cannot be reduced by the addition of $Mg(OH)_2$ as soluble magnesium compound when a proportion of organic acid is present.

Although the above-described embodiments of the invention are preferred, it will be apparent that the invention is not limited to these embodiments and can be modified as desired within the scope of the disclosure.

The invention claimed is:

1. A method for adjusting a viscosity of an aluminum sulfate suspension,
the method comprising as alternative (1), the steps of:
a) initially charging an aqueous preparation of aluminum sulfate and
b) mixing in a soluble magnesium compound
c) optionally mixing in further aluminum sulfate,
to obtain an aluminum sulfate suspension,
or
the method comprising as alternative (2), the steps of:
a) initially charging an aqueous preparation of a soluble magnesium compound and
b) mixing in aluminum sulfate to obtain an aluminum sulfate suspension, and
wherein, with regard to both alternatives (1) and (2), no organic acids are charged or mixed in.

2. The method as claimed in claim 1, wherein the aluminum sulfate suspension is at least one of a solidification accelerator and a hardening accelerator for a mineral binder.

3. The method as claimed in claim 1, wherein the magnesium compound is at least one selected from the group consisting of an oxide, a hydroxide, a carbonate, a nitrate, a sulfate, a phosphate, a halide, a formate, a citrate, and an acetate.

4. The method as claimed in claim 1, wherein the magnesium compound is at least one selected from the group consisting of magnesium carbonate, magnesium oxide, and magnesium hydroxide.

5. The method as claimed in claim 1, wherein an amount of the magnesium compound is chosen such that magnesium atoms, based on a total weight of the aluminum sulfate suspension, have a proportion of 0.02-6.3% by weight.

6. The method as claimed in claim 1, wherein the aluminum sulfate suspension, based on a total weight of the aluminum sulfate suspension, has a proportion of sulfate ($SO_4^-$) of 19-40% by weight, and the aluminum sulfate suspension, based on the total weight of the aluminum sulfate suspension, has a proportion of aluminum (Al) of 3.5-10% by weight.

7. The method as claimed in claim 1, wherein the aluminum sulfate suspension, based on a total weight of the aluminum sulfate suspension, contains 22-46% by weight, of aluminum sulfate ($Al_2(SO_4)_3$).

8. The method as claimed in claim 1, wherein the aluminum sulfate suspension, based on a total weight of the aluminum sulfate suspension, contains 0.01-15% by weight of aluminum hydroxide.

9. The method as claimed in claim 1, wherein a molar ratio of aluminum to sulfate in the aluminum sulfate suspension is <0.7.

10. The method as claimed in claim 1, wherein the aluminum sulfate suspension, based on a total weight of the aluminum sulfate suspension, has a proportion of water of 30-80% by weight, including water of crystallization from components of the aluminum sulfate suspension.

11. The method as claimed in claim 1, wherein the soluble magnesium compound reduces the viscosity of the aluminum sulfate suspension.

12. The method as claimed in claim 11, wherein the magnesium compound reduces the viscosity in combination with a calcium compound.

13. The method as claimed in claim 12, wherein the calcium compound is at least one selected from the group consisting of an oxide, a hydroxide, a carbonate, a nitrate, a sulfate, a phosphate, a halide, a formate, an acetate, and a citrate.

14. The method as claimed in claim 12, wherein the calcium compound is at least one selected from the group consisting of calcium carbonate, calcium oxide, and calcium hydroxide.

15. The method as claimed in claim 12, wherein an amount of the calcium compound is chosen such that calcium atoms, based on a total weight of the aluminum sulfate suspension, have a proportion of 0.001-4% by weight.

16. The method as claimed in claim 1, wherein the aluminum sulfate suspension is a spray concrete accelerator.

17. The method as claimed in claim 1, wherein the molar ratio of aluminum to sulfate in the aluminum sulfate suspension is <2:3.

18. An accelerator being at least one of a solidification accelerator and a hardening accelerator for a mineral binder, the accelerator comprising:
a) 22-46% by weight of aluminum sulfate ($Al_2(SO_4)_3$;
b) optionally 0.01-15% by weight of aluminum hydroxide ($Al(OH)_3$);
c) 0.035-10.4% by weight of magnesium oxide;
d) optionally 0.001-5% by weight of calcium oxide;

e) optionally 0.001-10% by weight of iron;
f) optionally 0.001% to 5% by weight of silicon dioxide;
g) optionally 0.001-20% by weight of at least one of an alkali metal aluminate and an alkaline earth metal aluminate;
h) optionally 0.1-15% by weight of alkanolamine;
i) optionally 0.01-10% by weight of fluoride;
j) and a remainder being water, wherein the accelerator is free from organic acids.

19. The accelerator as claimed in claim 18, wherein the at least one of the solidification accelerator and the hardening accelerator is a spray concrete accelerator.

* * * * *